(12) United States Patent
Fagan et al.

(10) Patent No.: US 7,328,011 B2
(45) Date of Patent: Feb. 5, 2008

(54) MANAGEMENT OF MOBILE NETWORKS

(75) Inventors: C. L. Fagan, Bellevue, WA (US); Tri M. Phan, Renton, WA (US); Michael A. D'Annunzio, Seattle, WA (US); Ben C. Forbes, Seattle, WA (US)

(73) Assignee: The Boeing Company, Chicago, IL (US)

( * ) Notice: Subject to any disclaimer, the term of this patent is extended or adjusted under 35 U.S.C. 154(b) by 78 days.

(21) Appl. No.: 10/973,768

(22) Filed: Oct. 26, 2004

(65) Prior Publication Data

US 2005/0221814 A1    Oct. 6, 2005

Related U.S. Application Data

(60) Provisional application No. 60/558,503, filed on Mar. 31, 2004.

(51) Int. Cl.
*H04Q 7/20* (2006.01)

(52) U.S. Cl. .................. 455/431; 455/419; 455/422.1; 455/423; 455/424; 455/427; 455/188.1; 455/98; 701/3; 701/29; 701/31; 340/945; 340/963

(58) Field of Classification Search ................ 455/419, 455/423, 424, 427, 431, 188.1, 98; 709/205, 709/206, 207; 701/3, 29, 31; 340/945, 963
See application file for complete search history.

(56) References Cited

U.S. PATENT DOCUMENTS

| | | | | |
|---|---|---|---|---|
| 4,729,102 A | * | 3/1988 | Miller et al. | .................. 701/14 |
| 5,381,140 A | * | 1/1995 | Kuroda et al. | .............. 340/961 |
| 5,742,336 A | * | 4/1998 | Lee | ............................ 348/144 |
| 5,805,683 A | * | 9/1998 | Berberich, Jr. | ......... 379/142.03 |
| 5,937,366 A | * | 8/1999 | Zbytniewski et al. | ....... 702/108 |
| 6,741,841 B1 | * | 5/2004 | Mitchell | .................. 455/188.1 |
| 6,917,863 B2 | * | 7/2005 | Matos | ......................... 701/16 |
| 2002/0160773 A1 | * | 10/2002 | Gresham et al. | ............ 455/431 |
| 2004/0260777 A1 | * | 12/2004 | Kolb et al. | ................. 709/206 |
| 2005/0065667 A1 | * | 3/2005 | Weineck | ......................... 701/3 |
| 2005/0221818 A1 | * | 10/2005 | Johnson et al. | ............. 455/431 |
| 2005/0233739 A1 | * | 10/2005 | Forbes et al. | ............... 455/431 |

\* cited by examiner

*Primary Examiner*—Steve M. D'Agosta
(74) *Attorney, Agent, or Firm*—Robert R. Richardson, P.S.

(57) ABSTRACT

Exemplary methods and systems manage a mobile network. A mobile network node is managed when the node is connected to the network. However, an alarm is not necessarily generated when the node is not connected to the network. A status message is periodically generated and transmitted from the mobile network node to a network control facility. The status message may include any status information regarding the mobile network node as desired. When the status message is indicative of a predetermined condition, an alarm is automatically generated. When no status message is received from the mobile network node, a determination is made whether connectivity exists between the mobile network node and the network. If connectivity does not exist between the mobile network node and the network, then no alarm is generated. If connectivity does exist between the mobile network node and the network, then an alarm is generated.

10 Claims, 8 Drawing Sheets

MANAGEMENT OF MOBILE NETWORKS

CROSS-REFERENCE TO RELATED APPLICATIONS

This Application is a Non-Prov of Prov (35 USC 119(e)) application No. 60/558,503 filed on Mar. 31, 2004, the contents of which are hereby incorporated by reference.

FIELD OF THE INVENTION

This invention relates generally to network communications and, more specifically, to management of mobile communication networks.

BACKGROUND OF THE INVENTION

Information is often exchanged and entertainment content is often broadcast as packetized data over communication networks. Typically, an end user accesses information or entertainment content via a user terminal such as a desktop computer, a laptop computer, a personal digital assistant (PDA), and Internet-enabled mobile phone, or the like. The user terminals may be connected to the network via wireless radiofrequency (RF) connectivity or, with the exception of a mobile phone, via a cable connection. Further, the network typically includes routers and servers for routing the data packets from content providers or other network destinations to the end user through networks, such as the internet.

Organizations and enterprises are becoming more and more dependent upon such networks for day-to-day operations. Further, a significant number of organizations, such as Connexion by Boeing™, are in the business of providing such networks for end users. Because of the importance of maintaining network operations to organizations and to end-users/customers, network management tools have been developed to monitor network operations and status.

Conventional network management tools assume that a network is always "up" and communicating. This is because conventional network management tools assume that a network is physically stationary—such as being installed in a land-based facility like a building. To that end, conventional tools periodically gather information from nodes connected to the network. If a node does not answer the periodic message from the tool, then an alarm is generated.

However, a node may be a mobile platform such as an airplane, a maritime vessel, a land vehicle, or the like. In such a network, periodically the node is disconnected from the network. For example, an airplane may be in a hangar for engine maintenance or a ship may be in a drydock for hull painting. In such instances, disconnection of the node from the network is not indicative of health status of equipment within the node. Yet, conventional tools would generate an alarm in such a situation.

By their nature, mobile platform nodes physically move within and among coverage areas of a mobile network. Accordingly, managing the mobile platform nodes entails determining and using information regarding physical location of the mobile platform nodes. For example, it may be desirable to optimize bandwidth availability by assigning available bandwidth to a mobile platform when the mobile platform is in a coverage area that happens to have an excess of available bandwidth. As a further example, it may be desirable to correlate physical location of a mobile network node with alarms. That is, connectivity may be lost when a mobile network node physically moves from one RF coverage area to another RF coverage area. Moreover, it may be desirable to determine if several mobile network nodes that are generating alarms are physically located in a same RF coverage area. However, conventional network management tools do not address physical location or movement of nodes.

As a result, there is an unmet need in the art for a tool for managing a mobile network when a node, such as a mobile platform, is attached to the network but that does not necessarily generate an alarm when the node is not connected to the network.

SUMMARY OF THE INVENTION

Embodiments of the present invention provide a method and system for managing a mobile network. According to the present invention, a mobile network node is managed when the node is connected to the network. However, an alarm is not necessarily generated when the node is not connected to the network.

According to an embodiment of the present invention, a status message is periodically generated and transmitted from a mobile network node to a network control facility. The status message may include any status information regarding the mobile network node as desired. When the status message is indicative of a predetermined condition, an alarm is automatically generated. When no status message is received from the mobile network node, a determination is made whether connectivity exists between the mobile network node and the network. If connectivity does not exist between the mobile network node and the network, then no alarm is generated. If connectivity does exist between the mobile network node and the network, then an alarm is generated.

According to an aspect of the present invention, the status message may indicate any of several levels of severity of conditions. Advantageously, the network control facility automatically responds to the severity level indicated in the status message with a predetermined response. The predetermined response may include polling the mobile network node for further information.

According to another aspect of the present invention, the network control facility is provided information regarding physical location of the mobile network node. Advantageously, information can be correlated regarding several mobile network nodes that may be located in a vicinity of each other, such as in a same radiofrequency coverage area.

According to another aspect of the present invention, the status messages may include information regarding any aspect of the mobile network node, as desired. For example, the status messages may include without limitation information regarding health management, such as performance, built-in test, fault management, and the like; security management; configuration management; or the like.

DETAILED DESCRIPTION OF THE INVENTION

Embodiments of the present invention provide a method and system for managing a mobile network. According to the present invention, a mobile network node is managed when the node is connected to the network. However, an alarm is not necessarily generated when the node is not connected to the network.

By way of overview and according to an embodiment of the present invention, a status message is periodically generated and transmitted from a mobile network node to a network control facility. The status message may include any status information regarding the mobile network node as desired. When the status message is indicative of a predetermined condition, an alarm is automatically generated. When no status message is received from the mobile network node, a determination is made whether connectivity exists between the mobile network node and the network. If connectivity does not exist between the mobile network node and the network, then no alarm is generated. If connectivity does exist between the mobile network node and the network, then an alarm is generated.

An exemplary mobile network that includes an exemplary system for managing the mobile network will first be explained by way of non-limiting example. Next, an overview of management of a mobile platform within the mobile network will be explained. Finally, an exemplary method for managing the mobile network will be set forth.

Exemplary Mobile Network

Figure 1:
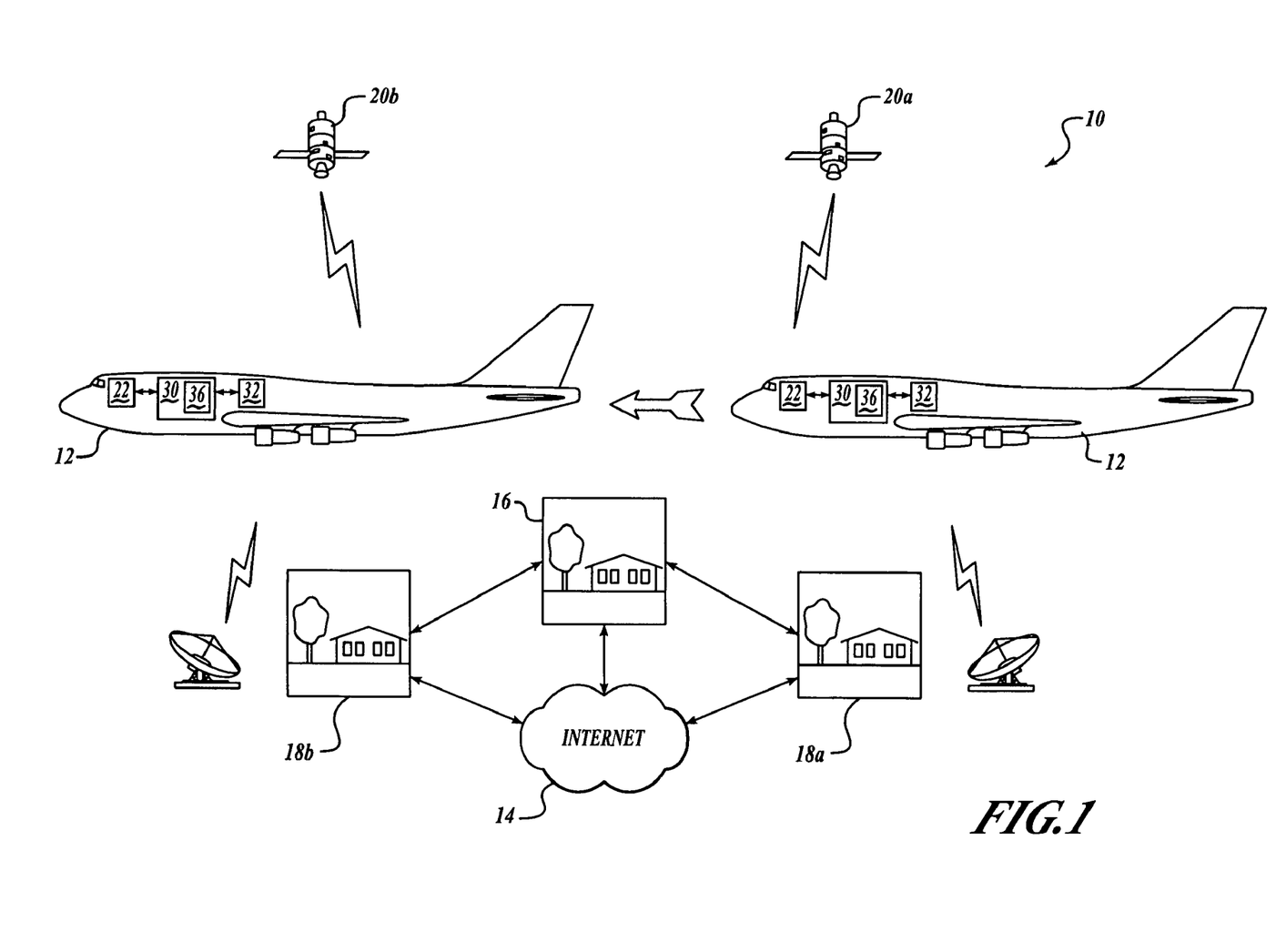
FIG. 1 is a block diagram of an exemplary mobile communications network.

Referring now to FIG. 1 and given by way of non-limiting example, an exemplary mobile communications network 10 provides communications between a mobile platform 12 and destinations connected to a network 14, such as the Internet. The mobile platform 12 may be any mobile platform as desired, such as without limitation an airplane, a maritime vessel, a land vehicle, or the like. The mobile platform 12 includes a data transmitter/receiver 22, a server 30 with a software agent 36, and a distribution system 32 that cooperate to implement exemplary functions according to an embodiment, as will be discussed below. While the mobile platform 12 is illustrated herein by way of non-limiting example, it is to be understood that such a representation is not intended to limit the mobile platform 12 to an airplane.

A network control facility 16, such as a network operations center (NOC), is in digital packet communication with the network 14. Ground stations 18a and 18b are in digital packet communication with the network control facility 16. The ground stations 18a and 18b are in radiofrequency (RF) communication with satellites 20a and 20b, respectively, such as without limitation Ku or Ka band geostationary satellites, that each have their own area of RF coverage. The mobile platform 12 is in RF communication with the satellite 20a when the mobile platform 12 is within the area of RF coverage of the satellite 20a. The mobile platform 12 is in RF communication with the satellite 20b when the mobile platform 12 is within the area of RF coverage of the satellite 20b. RF transmissions from the ground stations 18a and 18b to the satellites 20a and 20b, respectively, and from the satellites 20a and 20b to the mobile platform 12 are referred to as a forward link. RF transmissions from the mobile platform 12 to the satellites 20a and 20b and from the satellites 20a and 20b to the ground stations 18a and 18b, respectively, are referred to as a return link. If desired, entertainment content can be provided to the mobile platform 12 via the forward link.

Given by way of non-limiting example, an exemplary mobile communications network 10 that is well-suited for implementing embodiments of the present invention is Connexion by Boeing. Details regarding Connexion by Boeing are set forth in U.S. patent application Ser. No. 09/989,742 for Method and Apparatus for Providing Television and Data Services to Mobile Platforms, assigned to The Boeing Company, the contents of which are hereby incorporated by reference. It will be appreciated that RF connectivity may be established via cellular RF communications directly between the mobile platform 12 and the ground stations 18a and 18b instead of satellite RF communications, if desired.

Figure 2:
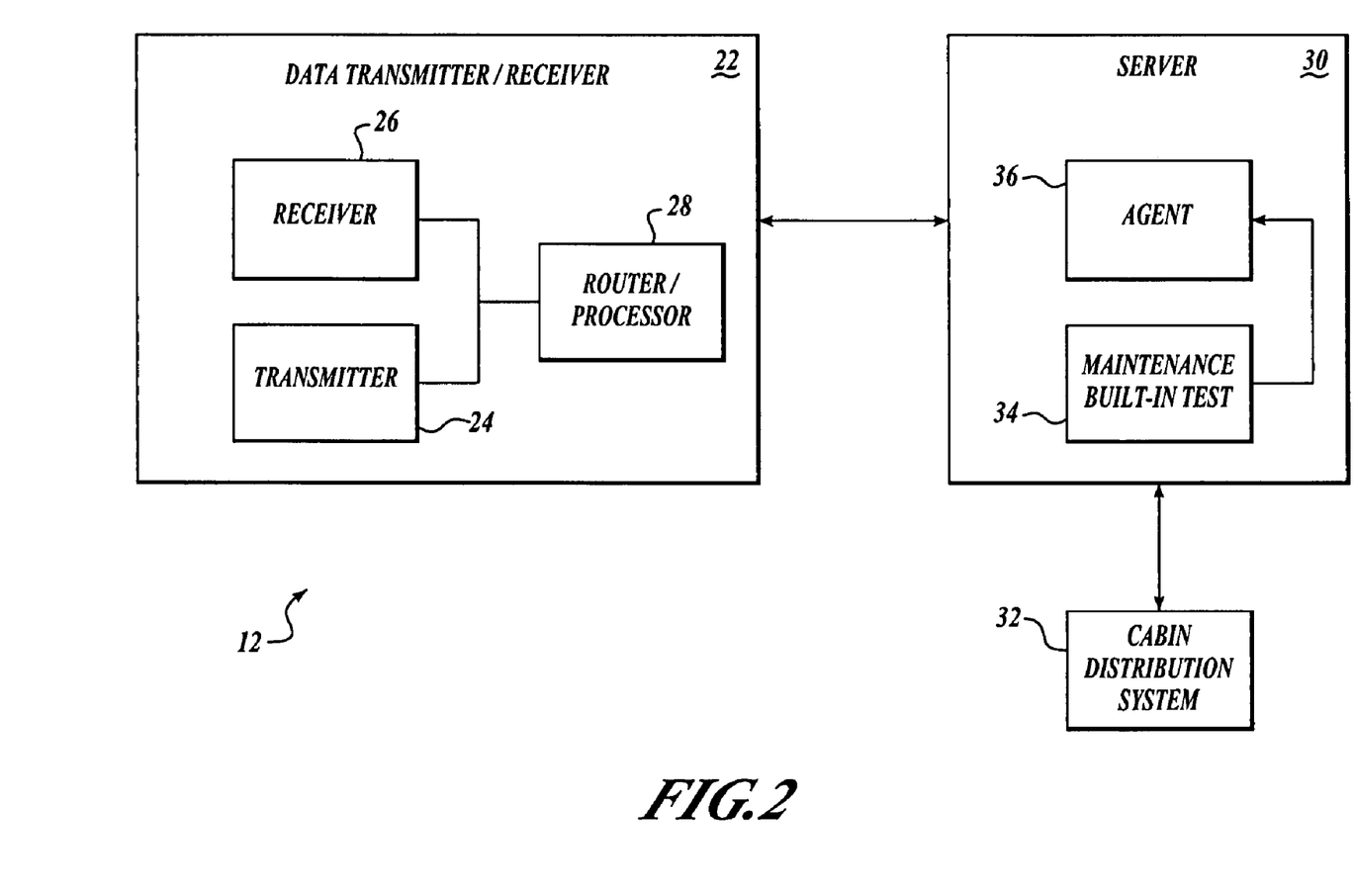
FIG. 2 is a block diagram showing details of a mobile platform that is part of the network of FIG. 1.

Referring now to FIG. 2, details will now be set forth regarding the mobile platform 12. The mobile platform 12 includes a data transmitter/receiver (DTR) 22. The DTR 22 includes a transmitter 24 and a receiver 26. The transmitter 24 and the receiver 26 are any suitable transmitter and receiver known in the art for transmitting and receiving Ka band or Ku band RF communications, or RF communications in frequency bands assigned to cellular or G3 communications, as desired. The transmitter 24 and the receiver 26 may be stand-alone components or may be provided as a transceiver, as desired for a particular application. The transmitter 24 and the receiver are both in signal communication with suitable transmit and receive antennas (not shown) or a suitable antenna with transmit and receive apertures, as desired. The antenna(s) may be any suitable phased array antenna or mechanical antenna known in the art as desired for a particular application.

The transmitter 24 and the receiver 26 are in digital packet communication with a router/processor 28. The router/processor 28 is any suitable router known in the art.

A server 30 is in digital packet communication with the router/processor 28. The server 30 is any suitable server known in the art. The server 30 distributes digital data packets to and from a distribution system 32 within a cabin (not shown) of the mobile platform. User terminals (not shown) such as laptop computers, personal digital assistants, cellular phones, or the like, or cabin displays and loudspeakers, as desired, are in wired or wireless packet communication with the server 30 via the cabin distribution system 32.

The components of the mobile platform as set forth above are known in the art, and a detailed discussion of their construction and operation is not necessary for an understanding of the invention. Nonetheless, further details of an exemplary DTR 22, server 30, and cabin distribution system 32 are set forth in U.S. patent application Ser. No. 09/989, 742 for Method and Apparatus for Providing Television and Data Services to Mobile Platforms, assigned to The Boeing Company, the contents of which are hereby incorporated by reference.

According to an embodiment of the present invention, the server 30 includes maintenance built-in test (BIT) functionality 34. The BIT functionality 34 suitably is implemented in software that resides on the server 30. The BIT functionality monitors and performs self-test diagnostic routines on components of the DTR 22, including the transmitter 24, the receiver 26, and the router/processor 28; the server 30; and components of the cabin distribution system 32 that are part of the mobile platform 12. That is, the BIT functionality 34 does not monitor or perform self-test diagnostic routines on user terminals that are connected within the cabin distribution system 32.

The built-in test functionality 34 communicates with a software agent 36 that is resident on the server 30. The agent 36 receives status information from the BIT functionality 34 and places the status information in a pre-formatted status message (discussed below). The agent 36 then causes the server 30 to communicate the status message to the DTR 22 for transmission. The agent 36 also receives commands (discussed below) from the network control facility 16 to poll the BIT functionality 34 for additional information and polls the BIT functionality 34 accordingly.

Figure 3:
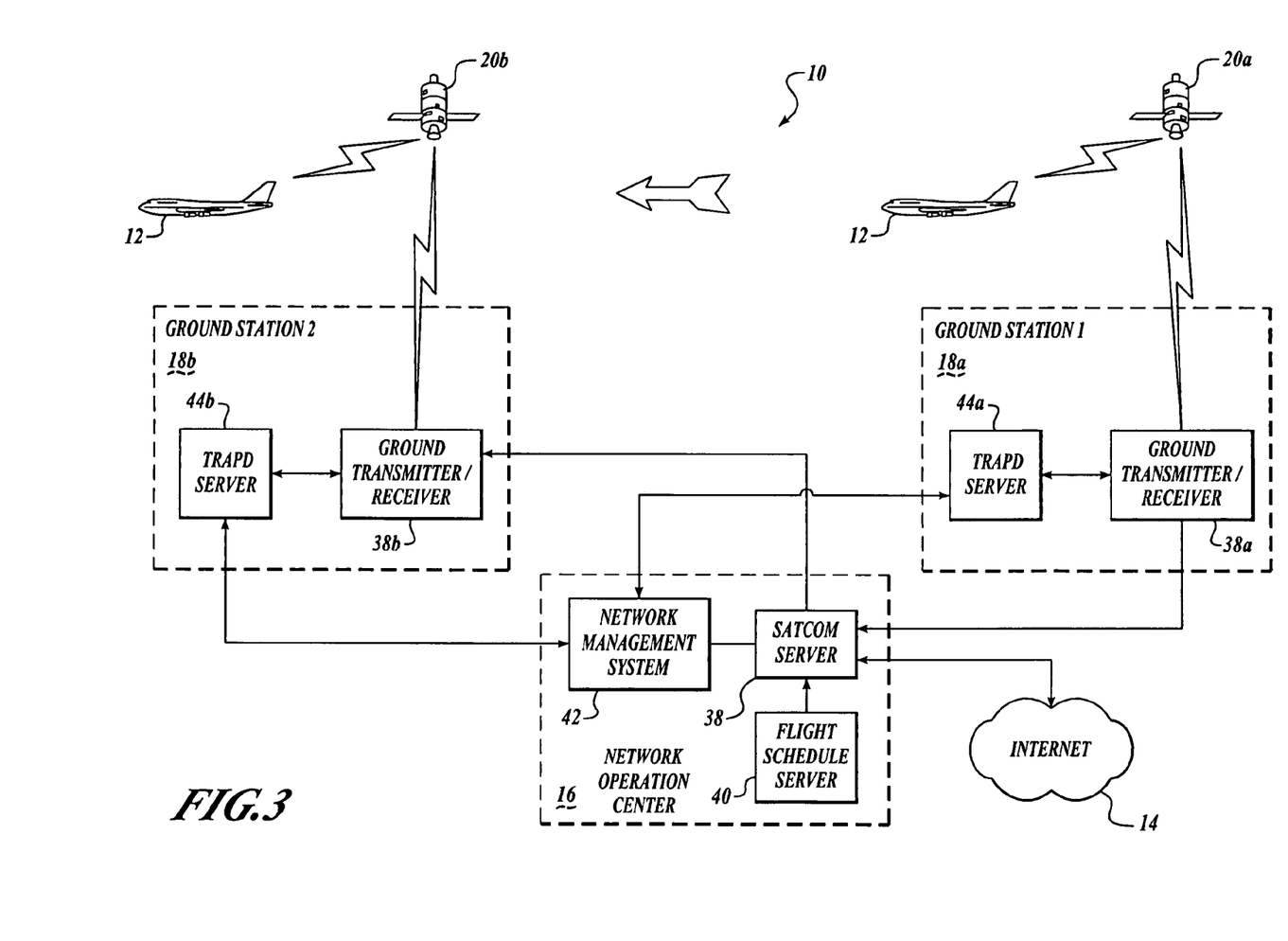
FIG. 3 is a block diagram showing details of the network of FIG. 1.

Referring now to FIG. 3, details of the network control facility 16 and the ground stations 18a and 18b will now be discussed. A communications server 38 within the network control facility 16 is in packet communication with the network 14. A schedule server 40 provides schedules of the mobile platforms 12, such as flight schedules, route schedules, cruise schedules, or the like, to the communications server 38. As a result, the communications server 38 is apprised of where the mobile platforms 12 are scheduled to be physically located. The communications server 38 is in signal communication with a ground transmitter/receiver 38a within the ground station 18a and a ground transmitter/receiver 38b within the ground station 18b. The ground transmitter/receivers 38a and 38b are in RF communication with the satellites 20a and 20b, respectively.

The network control facility 16 includes a network management system 42. The network management system 42 is in signal communication with the communications server 38. The network management system 42 is informed by the communications server 38 where the mobile platforms 12 are scheduled to be physically located and whether or not the mobile platforms 12 have established connectivity with the ground stations 18a or 18b. Information regarding physical location of the mobile platforms 12 informs the network management system 42 whether the mobile platform 12 is scheduled to be in the RF coverage area of the ground station 18a or the ground station 18b.

A message server 44a within the ground station 18a is in packet communication with the ground transmitter/receiver 38a, and a message server 44b within the ground station 18b is in packet communication with the ground transmitter/receiver 38b. The message servers 44a and 44b are in packet communication with the network management system 42.

As will be discussed below, the message servers 44a and 44b receive packetized data messages from the mobile platform 12 via the satellites 20a and 20b and the ground transmitter/receivers 38a and 38b, respectively, and communicate the packetized data messages to the network management system 42. As will also be discussed below, the network management system 42 analyzes the packetized data messages and generates an appropriate response to information contained within the packetized data messages. The network management system 42 communicates its response to the mobile platform 12 via the message server 44a, the ground transmitter/receiver 38a, and the satellite 20a, or the message server 44b, the ground transmitter/receiver 38b, and the satellite 20b, as appropriate for the physical location of the mobile platform 12.

Now that details regarding the mobile communications network 10 have been set forth, an explanation of an exemplary architecture for management of the mobile platform 12 will be discussed.

Exemplary Architecture for Mobile Platform Management

Figure 4:
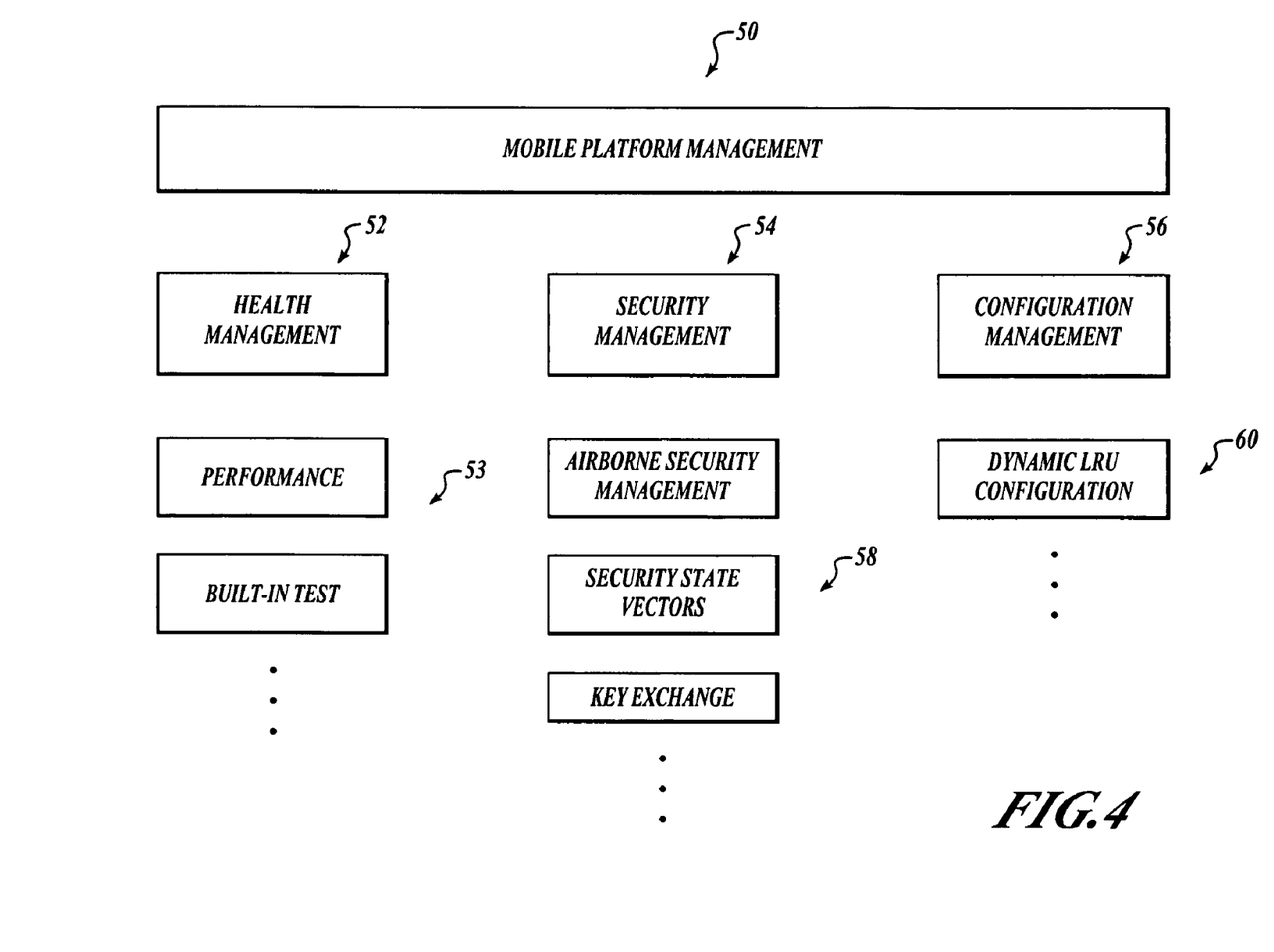
FIG. 4 illustrates a top level architecture of mobile platform management.

Referring now to FIG. 4, an exemplary architecture 50, given by way of non-limiting example, establishes a management protocol for the mobile platform 12. The architecture 50 includes without limitation a management object 52 for health management of the mobile platform 12, a management object 54 for security management of the mobile platform 12, and a management object 56 for configuration management of the mobile platform 12. It will be appreciated that the management objects 52, 54, and 56 are given by way of non-limiting example and that any management objects may be established as desired for a particular application.

The management object 52 for health management of the mobile platform 12 may include objects 53 as desired for managing health aspects of the mobile platform 12. The objects 53 include without limitation performance, built-in test, and the like, as desired. The management object 52 will be discussed below.

The management object 54 for security management of the mobile platform 12 may include objects 58 as desired for managing security aspects of the mobile platform 12, such as without limitation airborne security management, security state vectors, key exchange, and the like. Security management of the mobile platform 12 is discussed in pending U.S. patent application Ser. No. 11/003,944, the contents of which are hereby incorporated by reference.

The management object 56 for configuration management of the mobile platform 12 may include objects 60 as desired for managing configuration aspects of the mobile platform 12, such as without limitation dynamic configuration of line replaceable units (LRUs), and the like. Configuration management of the mobile platform 12 is discussed in pending U.S. patent application Ser. No. 10/973,727, the contents of which are hereby incorporated by reference.

Figure 5:
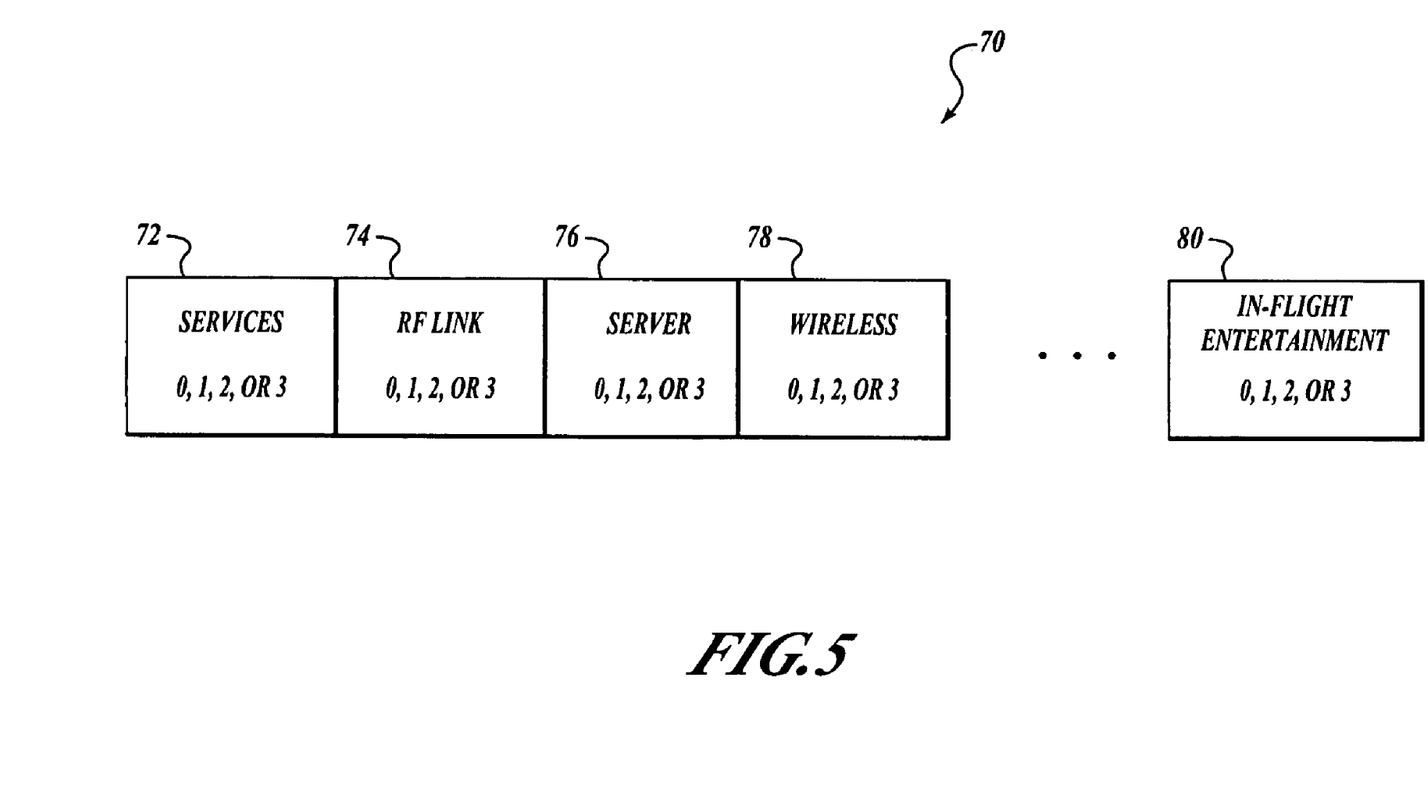
FIG. 5 illustrates an exemplary status reporting format according to the architecture of FIG. 4.

Referring now to FIG. 5, a message 70 includes data that contains information regarding health of the mobile platform 12 (FIGS. 1-3) as prescribed by the objects 53 (FIG. 4). The message 70 advantageously is a packetized digital data message that includes information fields, as desired, that contain data that describes the health or status of any aspect that comes within the object 53 (FIG. 4). Given by way of non-limiting example, in one exemplary embodiment the message 70 includes a field 72 for services; a field 74 for the RF link; a field 76 for the server 30 (FIG. 2); a field 78 for wireless connectivity within the cabin distribution system 32 (FIG. 2); and a field 80 for in-flight entertainment systems within the cabin distribution system 32 (FIG. 2). It will be appreciated that the fields 72, 74, 76, 78, and 80 are given by way of non-limiting example. It will be further appreciated that the message 70 is not to be limited to these exemplary fields illustrated herein, and that the message 70 may include any fields whatsoever as desired for a particular application depending upon the type of mobile platform, the type of service provided, and the like.

Data within the fields 72, 74, 76, 78, and 80 includes a numeric value that provides information regarding health or status of services (in the case of the field 72) or systems or equipment (in the cases of the fields 74, 76, 78, and 80) associated with the mobile platform 12 (FIGS. 1-3). Table 1 below shows exemplary values and information conveyed by those values:

TABLE 1

| Value | Description |
|---|---|
| Not applicable (0) | Not applicable in current system configuration |
| Good (1) | System or service is back to normal operational state (Severity = Clear) |
| Alert (2) | System or service has faults that may impact its operational state (Severity = Minor) |

TABLE 1-continued

| Value | Description |
| --- | --- |
| Fault (3) | System or service has faults that would impact its operational state (Severity = Major) |

In general, the value summarizes status or health of a service, component, equipment, system, or the like. For example, a Fault value of 3 indicates that the entire service or system is non-functional. An Alert value of 2 indicates that the service or component, equipment, or system is still operational but at a reduced capability, or that an event has occurred that indicates a possible future failure such as without limitation a disc-is-full performance threshold alert. A Good value of 1 indicates that the service or component, equipment, or system is performing nominally. A Not Applicable value of 0 indicates that the service is not offered or the component, equipment, or system is not installed.

In order for the network management system 42 (FIG. 3) to analyze and integrate information conveyed by the data contained in the fields of the message 70, attributes of the message 70 are examined by the network management system 42 (FIG. 3). For example, the attributes provide identifying information regarding the mobile platform 12 (FIGS. 1-3), operating mode information, amount of system use or loading onboard the mobile platform 12 (FIGS. 1-3), or the like. Exemplary attributes of the message 70 are shown below in Table 2.

TABLE 2

| Value | Description |
| --- | --- |
| Timestamp | Server 30 System Uptime |
| airToGroundIP | Private IP address of the server 30 |
| lastUpdateTimeUTC | Last time data in the message 70 was updated |
| currentOperatingMode | Operational mode of entire system on the mobile platform 12 (not just the server 30); 10 have the following values: Normal (1) Cold start (2) Test (3) |
| aircraftCBBid | Aircraft ID based on assigned private address (10.x.x.x space) |
| aircraftTailNumber | Aircraft tail number assigned by airlines |
| loadMetric | Number of current user logins |
| securityStatus1 | Number of security event messages generated since boot |

Now that an exemplary mobile communications network and an exemplary management architecture have been explained, an exemplary method according to an embodiment of the present invention will be set forth below.

Exemplary Method

Figure 6A:
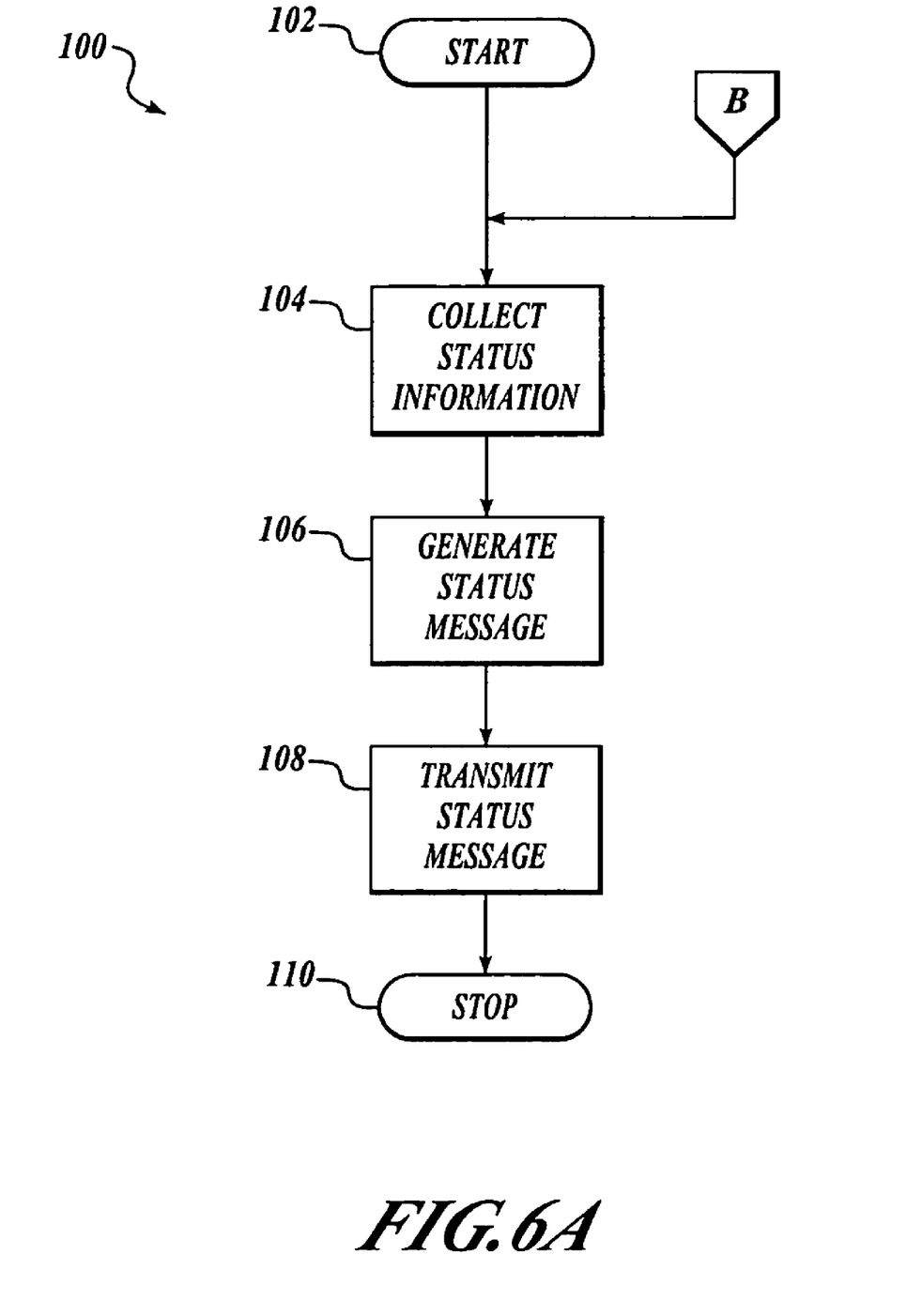
FIGS. 6A, 6B, and 6C are flowcharts of an exemplary method according to an embodiment of the present invention.
Figure 6B:
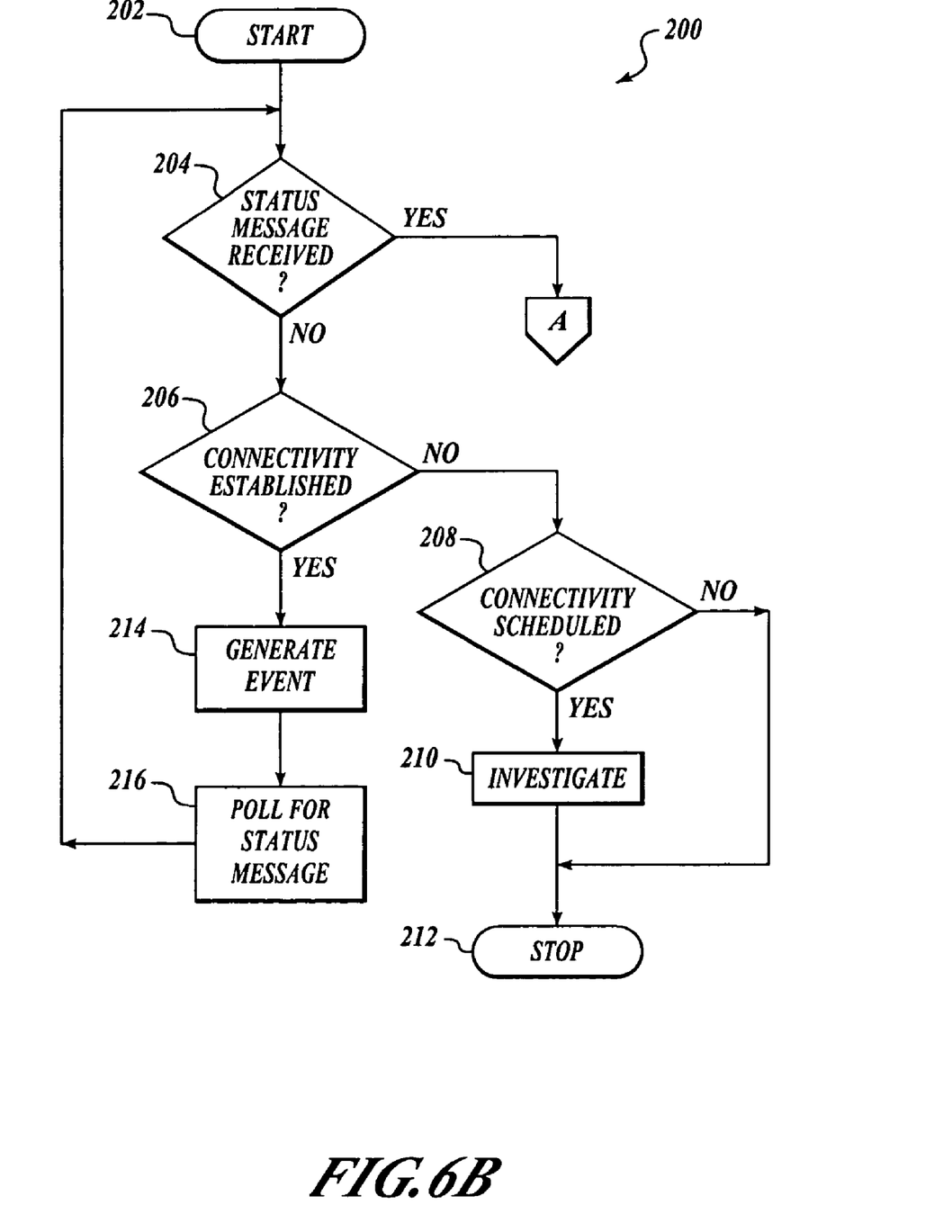
Figure 6C:
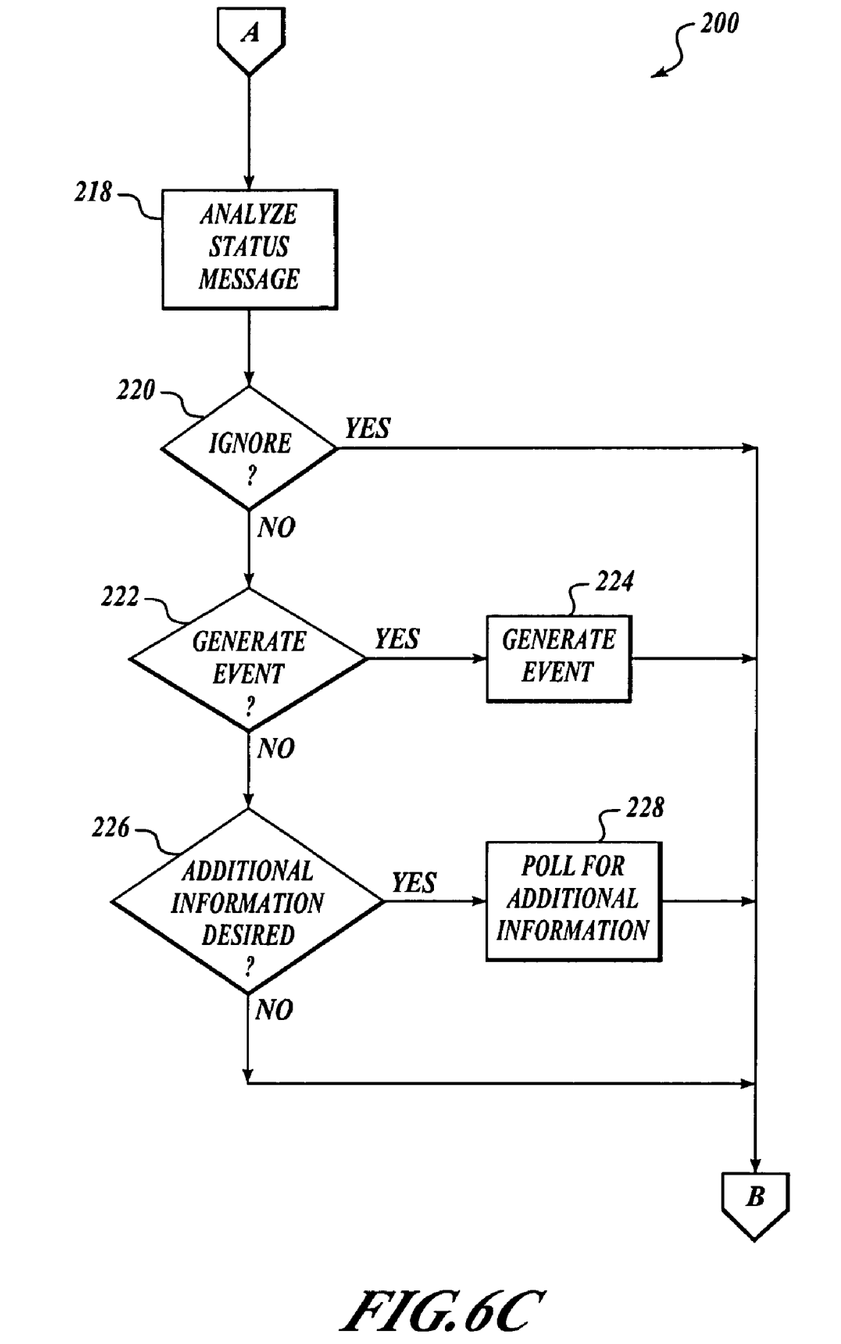

Referring now to FIGS. 6A, 6B, and 6C, an exemplary method is set forth for managing the mobile network 10 (FIGS. 1 and 3). The message 70 (FIG. 5) is generated and transmitted according to a routine 100 that is performed onboard the mobile platform 12 (FIGS. 1-3). The routine starts at a block 102. At a block 104, status information is collected. As discussed above, the software agent 36 (FIG. 2) collects status information from the BIT functionality 34. The software agent 36 may be preprogrammed to request collection of predetermined information from the BIT functionality 34. As such, the information may be autonomously and routinely collected on a periodic basis without polling or requests from the network management system 42 (FIG. 3). However, as will be discussed below, the software agent 36 may respond to a request from the network management system 42 for the software agent 36 to poll the BIT functionality 34 for specific information.

At a block 106, a status message is generated. The software agent 36 assembles the information collected at the block 104 from the BIT functionality 34 along with the attribute information discussed above into the message 70. The software agent 36 causes the message 70 to be communicated from the server 30 (FIG. 2) to the DTR 22 (FIG. 2).

At a block 108 the status message is transmitted. The message 70 is communicated to the transmitter 24 (FIG. 2) and is transmitted via the antenna(s) (not shown) to the satellite 20a or 20b (FIGS. 1 and 3) and the ground station 18a or 18b (FIGS. 1 and 3), respectively.

The routine 100 ends at a block 110. The routine 100 may be performed periodically, if desired. For example, in one presently preferred embodiment the routine 100 is performed around every five minutes or so.

A routine 200 is performed by the network management system 42 in conjunction with the routine 100. The routine 200 begins at a block 202. At a decision block 204 a determination is made whether the message 70 has been received. After transmission by the satellite 20a or 20b, the message 70 is received by the ground transmitter/receiver 38a or 38b (FIG. 3), respectively. The ground transmitter/receiver 38a or 38b communicates the message 70 to the message server 44a or 44b (FIG. 3). The message 70 is in turn communicated to the network management system 42.

If the message 70 has not been received by the network management system within the time period discussed above, then a determination is made at the decision block 204 that the status message has not been received. In this case, at a decision block 206 a determination is made whether or not connectivity is established between the mobile platform 12 and the ground station 18a or 18b. If connectivity has not been established, then no determination can be made regarding health of the mobile platform 12. At a decision block 208, a determination is made whether or not connectivity is scheduled. The schedule of the mobile platform 12 is accessed by the network management system 42 from the schedule server 40 (FIG. 3) via the communications server 38 (FIG. 3). Accessing the schedule of the mobile platform 12 permits the network management system 42 to determine if connectivity is scheduled to be established with the mobile platform 12. If the schedule indicates that connectivity should be established, then an RF connectivity issue may be presented and appropriate action may be warranted. In this case, the RF connectivity issue is investigated at a block 210. The routine 200 then ends at a block 212. If at the decision block 208 the schedule indicates that connectivity should not be established, then no further action is desired and the routine 200 ends at the block 212.

If at the decision block 206 a determination is made that connectivity is established (but the message 70 has not been received in the predetermined time period), then this indicates existence of an issue with health status of the mobile platform 12 of a nature that can not be determined. In this case, an event is generated by the network management system 42 at a block 214. At a block 216 the network management system 42 polls the mobile network 12 to send a status message. The routine 200 returns to the decision block 204 and the process described above repeats.

If at the decision block 204 a determination is made that the message 70 has been received, then at a block 218 the message 70 is analyzed by the network management system 42. The network management system 42 takes into account the attributes of the message 70, discussed above, in order to analyze information conveyed by the data content of the fields of the message 70 in a proper context. The network management system 42 reads the attributes from the message 70. This establishes a system and service status. A set of predetermined responses to values in the fields of the message 70 are established for each system and service status. That is, the network management system 42 takes actions, discussed below, in response to information in the message 70 based upon status of the mobile platform 12 as determined by the attributes of the message 70.

At a decision block 220, a determination is made whether or not the message 70 is to be ignored. If so, then the routine 100 is invoked at the block 104. The message 70 may be ignored when the attributes of the message 70 indicate a status in which ignoring the message is a predetermined response to the information in the fields of the message 70. For example, the message 70 may be ignored when the attribute "lastUpdateTimeUTC" indicates that this is the first message 70 that is received or the value of this attribute has not changed from a previous value because there is no change in the mobile network 12. As a further example, for each module in slots of the server 30 an attribute "cardPresent" is checked when analyzing status of the server 30. If the value of the "cardPresent" attribute is "notPresent", then the message 70 is ignored for the absent module and the analysis goes to the next module. Similarly, the message 70 for optional items may be ignored when the value of an attribute is "notApplicable".

If the message 70 is not to be ignored, then at a decision block 222 a determination is made whether or not an event is to be generated. The health or status of a service or system is determined by severity of events received for the service or system. In general, a Fault state is indicated by critical or major events; an Alert state is indicated by minor or warning events; and Clear events may be used to reset previously-set events, such as loss of the message 70. Given by way of non-limiting example, an event suitably is a record of analysis of information conveyed by the message 70. The event generally includes attributes such as severity and a summary. If an event is to be generated, then at a block 224 the event is generated and the routine 100 is invoked at the block 104.

The following exemplary events are given by way of non-limiting examples:

Check Status of the Server 30 at the Field 76

When the value of the data in the field 76=not applicable (0), generate an event with the following attributes:

---
severity = warning
summary = "<aircraftCBBid>:server 30 system information was not available from server 30. Current logins:<loadMetric>"

---

When the value of the data in the field 76=good (1), generate an event with the following attributes:

---
severity = Clear
summary = "<aircraftCBBid>:server 30 system status: Good. Current logins:<loadMetric>"

---

When the value of the data in the field 76=alert (2), generate an event with the following attributes:

---
severity = Minor
summary = "<aircraftCBBid>:server 30 system status: Alert. Current logins:<loadMetric>"

---

When the value of the data in the field 76=fault (3), generate an event with the following attributes:

---
severity = Major
summary= "<aircraftCBBid>:server 30 system status: Fault. Current logins:<loadMetric>"

---

If a determination is made at the decision block 222 that an event is not to be generated, then at a decision block 226 a determination is made whether additional information is desired. When the attributes and information contained in the message 70 indicate that certain conditions may be indicated, obtaining more information would permit further analysis to rule out or confirm the condition. To that end, the network management system 42 automatically requests predetermined information at a block 228. The routine 100 is then invoked at the block 104.

The following non-limiting examples show instances when an event is not generated but additional information is requested:

Check Wireless Status in the Field 78

When the value of the data in the field 78 < > (is not equal to) notApplicable, then at the block 230 the network management system 42 polls the server 30 for the following attributes of all wireless units with the cabin distribution system 32 in order to pinpoint wireless units that may have issues:

wirelessCDSTableIndex;

wirelessCDSunitStatus; and wirelessCDSunitLocation.

Check Status of the Server 30 in the Field 76

When the value of the data in the field 76 < > (is not equal to) notApplicable, then at the block 230 the network management system 42 polls the server 30 for the following attributes of all cards installed in the server 30:

corenetIndex (slot number in coreNet chassis)

cardStatus (notApplicable; good; alert; or fault)

cardPresent (notPresent; present; or notAvailable)

cardPowerStatus (noPower; powerApplied; or notAvailable)

cardLedStatus (notImplemented; normal; thermalError; lowCharge; poweringUp; fsmVoltageFailure; fsmRunningFailure; batteryFailure; off; or notAvailable)

corenetLRMdescription (description of each LRM card)

If a determination is made at the decision block 226 that additional information is not requested, then the routine 100 is invoked at the block 104.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for managing a mobile communications network, the method comprising:

after a predetermined time period, periodically transmitting from a mobile platform a message including attributes and status information indicative of a first plurality of predetermined conditions regarding at least one status category chosen from services that are offered onboard the mobile platform and mobile communications equipment that is installed onboard the mobile platform;

at a ground Station of a mobile communications network, generating a first event when the message is not received by the ground station and connectivity is established between the mobile platform and the ground station;

at the ground station, when the message is not received by the ground station and connectivity with the mobile platform is not established, determining if connectivity with the mobile platform is scheduled;

at the ground station, analyzing the message when the message is received by the ground station;

and at the ground station, generating a plurality of second events responsive to the first plurality of predetermined conditions indicated by the message.

2. The method of claim 1, further comprising automatically collecting the status information onboard the mobile platform.

3. The method of claim 1, further comprising requesting additional information from the mobile platform responsive to a second plurality of predetermined conditions.

4. The method of claim 1, wherein the information regarding status includes information indicative of severity of a detected fault.

5. The method of claim 1, further comprising, when the message is not received by the ground station and connectivity with the mobile platform is established, polling the mobile platform for the message.

6. The method of claim 1, further comprising determining whether or not to ignore the message when the message is received.

7. A system for managing a mobile communications network, the system comprising:

a server onboard a mobile platform, the server having a first server component that is configured to periodically generate, after a predetermined time period, a message including attributes and status information indicative of a first plurality of predetermined conditions regarding at least one status category chosen from services that are offered onboard the mobile platform and mobile communications equipment that is installed onboard the mobile platform; and a network management system disposed at a ground station of a mobile communications network, the network management system including:

a first network management component configured to generate a first event when the message is not received by the ground station and connectivity is established between the mobile platform and the ground station;

a second network management component configured to, when the message is not received by the ground station and connectivity with the mobile platform is not established, determine if connectivity with the mobile platform is scheduled;

a third network management component configured, to analyze the message when the message is received; and a fourth network management component configured, to generate a plurality of second events responsive to the first plurality of predetermined conditions indicated by the message.

8. The system of claim 7, wherein the server has a second server component that is configured to automatically collect the status information onboard the mobile platform.

9. The system of claim 7, wherein the network management system includes a fourth network management component that is configured to request additional information from the mobile platform responsive to a second plurality of predetermined conditions.

10. The system of claim 7, wherein the network management system further includes a sixth network management component configured to, when the message is not received by the ground station and connectivity with the mobile platform is established, poll the mobile platform for the message.

* * * * *